(12) United States Patent
M et al.

(10) Patent No.: US 9,472,072 B2
(45) Date of Patent: Oct. 18, 2016

(54) SYSTEM AND METHOD OF POST EVENT/ALARM ANALYSIS IN CCTV AND INTEGRATED SECURITY SYSTEMS

(75) Inventors: Deepak Sundar M, Bangalore (IN); Silky Chathukutty, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 542 days.

(21) Appl. No.: 13/464,549

(22) Filed: May 4, 2012

(65) Prior Publication Data

US 2013/0293718 A1 Nov. 7, 2013

(51) Int. Cl.
*G08B 13/196* (2006.01)
*H04N 7/18* (2006.01)

(52) U.S. Cl.
CPC ... *G08B 13/19691* (2013.01); *G08B 13/19669* (2013.01); *G08B 13/19671* (2013.01); *G08B 13/19697* (2013.01); *H04N 7/181* (2013.01); *H04N 7/188* (2013.01)

(58) Field of Classification Search
CPC .... G08B 13/18; G08B 13/196; G08B 15/00; G08B 13/19691; G08B 13/19669; G08B 13/19671; G08B 13/19697; H04N 7/181; H04N 7/188
USPC .................................................. 348/152–156
See application file for complete search history.

(56) References Cited

U.S. PATENT DOCUMENTS

| | | | | |
|---|---|---|---|---|
| 5,268,670 A * | 12/1993 | Brasch | ................... | G08B 13/08 340/522 |
| 5,966,074 A | 10/1999 | Baxter | | |
| 7,467,400 B1 * | 12/2008 | Moss | ................. | G07C 9/00166 713/150 |
| 2006/0109113 A1 * | 5/2006 | Reyes et al. | .................. | 340/541 |
| 2006/0238618 A1 * | 10/2006 | Wren et al. | ..................... | 348/155 |
| 2006/0279630 A1 | 12/2006 | Aggarwal et al. | | |
| 2006/0288288 A1 * | 12/2006 | Girgensohn et al. | ......... | 715/716 |
| 2007/0268145 A1 * | 11/2007 | Bazakos et al. | ........... | 340/573.1 |
| 2009/0237247 A1 * | 9/2009 | Brunetti et al. | .............. | 340/541 |
| 2011/0205050 A1 * | 8/2011 | Pineau | ................... | G08B 25/14 340/506 |
| 2012/0268550 A1 * | 10/2012 | Park | .......................... | 348/14.02 |
| 2013/0278422 A1 * | 10/2013 | Friedman | ...................... | 340/541 |

FOREIGN PATENT DOCUMENTS

| | | |
|---|---|---|
| GB | 2482127 A | 1/2012 |
| JP | 4-205200 A | 7/1992 |
| JP | 10-172078 | 6/1998 |

OTHER PUBLICATIONS

Oliver Vellacot, IP Video—CCTV Solutions for Petrochemical Plants (Jan. 1, 2009).

* cited by examiner

*Primary Examiner* — Gelek W Topgyal
(74) *Attorney, Agent, or Firm* — Husch Blackwell LLP

(57) ABSTRACT

A method and apparatus are provided. The method includes the steps of detecting a plurality of events within a secured area detected by respective sensors that have been activated within a predetermined time period of one another, wherein at least one of the plurality of events is an alarm event, ordering the plurality of events based upon a reporting time of each of the plurality of events, and displaying a map showing the respective sensors that have been activated within a predetermined time period of one another within the secured area along with a potential route of an intruder traveling among locations of the respective sensors that have been activated within a predetermined time period of one another in accordance with the reporting time of each of the plurality of events.

20 Claims, 6 Drawing Sheets

SYSTEM AND METHOD OF POST EVENT/ALARM ANALYSIS IN CCTV AND INTEGRATED SECURITY SYSTEMS

FIELD

The field of the invention relates to security systems and, more particularly, to methods of monitoring security systems.

BACKGROUND

Security systems for homes and businesses are generally known. Such systems are typically based upon the use of a physical barrier around a secure area combined with one or more sensors of life or safety events.

A life or safety event could include the detection of an intruder or of a fire. In the case of a fire, the sensors could be based upon any of a number of different sensor technologies (e.g., smoke detection, carbon monoxide detection, etc.).

In the case of intrusion, the sensors could include one or more perimeter sensors (e.g., limit switches on doors or windows) to detect entry of intruders. One or more passive infrared (PIR) sensors or motion detectors may also be provided within an interior of the protected space to detect intruders who have entered without detection by the perimeter sensors.

In large facilities, a number of television cameras incorporated into a closed circuit television (CCTV) system may be distributed throughout the secure area in order to detect intruders. A person (e.g., a guard) at a guard station may view a television monitor coupled to the cameras in order to directly observe the presence of intruders.

While such systems work well, it is often difficult to comprehend the true nature of any situation in a large facility that may contain dozens of security cameras and sensors. In such cases, it is often necessary to review recorded video from each of the cameras in order to conduct a forensic review of an event. Because of the difficulties presented by large systems, a need exists for better methods of analyzing security events.

DETAILED DESCRIPTION OF AN ILLUSTRATED EMBODIMENT

Figure 1:
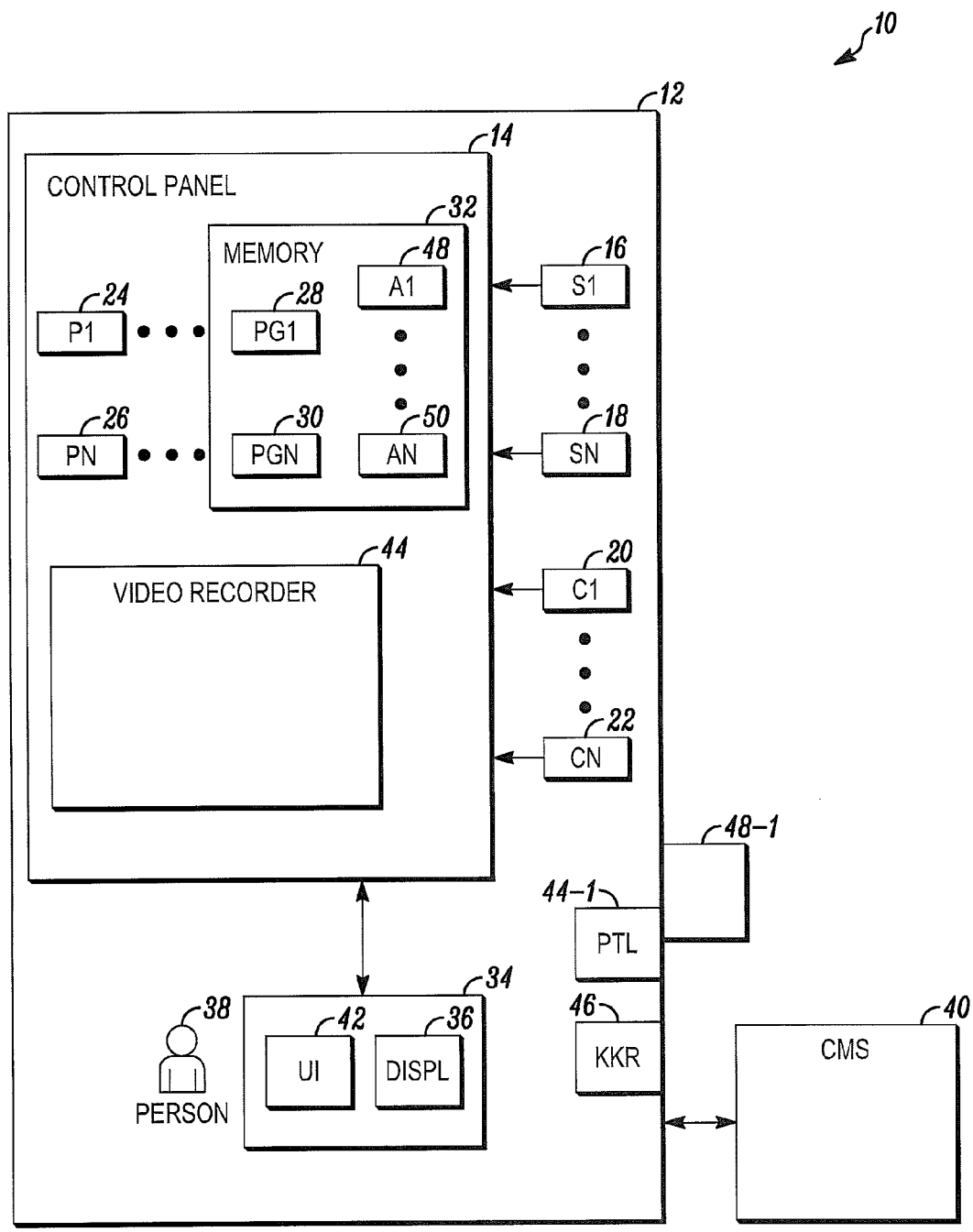
FIG. 1 is a block diagram of an alarm system shown generally in accordance with an illustrated embodiment.

FIG. 1 is a block diagram of a security system 10 used to provide protection to a secured area 12 shown generally in accordance with an illustrated embodiment. Included within the system 10 may be a number of sensing devices. The sensing devices may include sensors 16, 18 and a number of cameras 20, 22, 48-1. The sensors 16, 18 may be intrusion sensors (e.g., door or window switches) that detect a security event such as an intruder opening or breaking a window or door. Alternatively or in addition, the sensors may include one or more PIR motion detectors or environmental detectors (e.g., smoke detectors, carbon monoxide detectors, etc.) that detect environmental events.

The cameras 20, 22, 48-1 may be conventional analog cameras or smart cameras. Cameras 20, 22 may have a field of view covering the interior of the secured area while camera 48-1 may be an exterior camera. Where provided as smart cameras, the cameras 20, 22, 48-1 may include an internal hardware processor with the processing capability to detect motion within a field of view of the camera 20, 22, 48-1.

The sensors 16, 18 and cameras 20, 22, 48-1 may be coupled to a control panel 14 of the security system 10. Included within the control panel 14 may be one or more processors 24, 26 embodied as hardware where each processor operates under control of one or computer programs 28, 30 loaded from a non-transient computer readable medium (memory) 32.

The system 10 may also provide data to and receive instructions from a computer terminal 34. A security system operator (person) 38 may use a user interface 42 of the terminal 34 to select and view images from each of the cameras 20, 22, 48-1 in real time on a display 36. The operator 38 may also select a camera 20, 22, 48-1, enter a time and date through the user interface 42 and view images from the camera 20, 22, 48-1 that have been previously recorded and saved in a video recorder 44.

In general, the system 10 may include an alarm processor 24, 26 that continuously monitors the sensors 16, 18 and cameras 20, 22, 48-1 for security events. Security events may be divided into alerts that represent suspicious activity and alarm events. Alarm events may include the detection of a fire by one of the sensors 16, 18 or of the presence of an intruder by a PIR or detector camera. In the event of an alarm event, the alarm processor 24, 26 may automatically display a notification of the alarm event on the display 36.

In addition to displaying an alarm notification on the display 36, the alarm processor may also create an event record and save a copy of the event record in a file 48, 50 stored in memory 32. The event record may include a time (time stamp) of the event and an identifier of the sensor 16, 18 or camera 20, 22 that detected the event.

The alarm processor 24, 26 may also compose an alarm message and forward the alarm message to a central monitoring station 40. The central monitoring station 40 may respond in an appropriate manner (e.g., notify a local police or fire department, summon a local security service, etc.).

In contrast, security alerts may be processed by the alarm processor 24, 26 or by one or more separate alert processors 24, 26 provided for that purpose. For example, an entry processor 24, 26 may process identification information from a user interface (e.g., keypad, a key card reader, a fingerprint or iris scanner, etc.) 46 located adjacent an entrance upon entry of an authorized person through the entrance/exit portal (e.g., a door) 44-1. The user interface 46 may be located inside the secured area 12 (as shown in FIG. 1) or be located outside.

In this case, the alarm processor 24, 26 may detect opening of the door 44-1 via one of the sensors 16, 18 while in an armed state and enter a delay mode pending receipt of authorization entered through the user interface 46 and received from the entry processor 24, 26. Upon receipt of the authorization from the entry processor, the alarm processor may cancel the alarm event caused by the opening of the door 44-1 and enter an alarm stay mode. Alternatively, the alarm processor may simply disable interior intrusion detectors.

On the other hand (and in the alarm stay mode), one or more of the cameras 20, 22 may continue to process images from the interior of the secured area 12. For example, a tracking processor 24, 26 may process images from one or more of the cameras 20, 22, 48-1 to detect suspicious activity. For example, if the tracking processor should detect two people entering through the door 44-1 while authorization was received from the entry processor for only one person, then the tracking processor (or alarm processor) may issue a security alert. The security alert may be presented on the display 36 or saved as a security event within a file 48, 50 along with a time of the event, an identifier of the camera that captured the images and a user identifier received through the interface 46.

Alternatively, a processor 24, 26 (loitering processor) may monitor for loitering in specific areas. For example, a person loitering near a door 44-1 without opening the door for a predetermined time period may be interpreted as awaiting the approach of an unauthorized person and an attempt to allow entry by an unauthorized person. In this case, the loitering processor may save or issue a security alert as described above.

Other examples may include respective alert processors 24, 26 that detect the disabling of a camera 20, 22. In this case, a corresponding tampering processor 24, 26 may monitor video from each camera 20, 22 and, upon loss of video, the processor may issue and save a security alert.

Similarly, a door processor may monitor fire doors (even in a disarmed state). In this case, the opening of a fire door that is not normally used as an exit or entrance may trigger issuing and saving of a corresponding security alert in a file 48, 50.

Alternatively, a head count processor 24, 26 may count people entering and leaving the secured area 12 via the portal 44-1 and user interface 46. If the head count processor counts a greater number of people than authorized inside the secured area 12 (suggesting the presence of one or more unauthorized persons), then the head count processor may issue and save a security alert in a corresponding file 48, 50.

In addition to detecting and presenting security alerts in real time, the system 10 also includes a correlation detection and presentation processor 24, 26 that detects two or more security events that are related through a correlation established by time and location. Correlated in time simply means that the related security events occur within some predetermined time period. Correlation by location means that the correlated events occur close enough together such that they may all also share the same root cause. For example, related security events may be displayed on a geographic map of the secured area with the correlation of locations indicated generally by their relative locations on the map and the correlation of time depicted as the potential path of an intruder traveling from one location to the other based upon the respective times of the events.

In this regard, the correlation processor may base the evaluation of correlations upon the content of a correlation file that identifies master devices, alarm states and configuration groups within the system 10. In this regard, one or more master devices may be designated by the user 38 and used as a basis for the presentation of correlated information and based upon a state of the alarm system 10. The presentation of correlated information may occur automatically based upon receipt of an alarm (or security event) or manually at the convenience of the operator 38.

In this regard, configuration groups may be designated in conjunction with a master device and used to allow the operator 38 to further investigate the correlated information. For example, any sensor 16, 18 or camera 20, 22 with motion detection may be designated as a master device in the armed or disarmed state. Other cameras 20, 22 with a field of view proximate the designated master device may be grouped with the master device as a source of further information based upon distance from the designated master device. A processor 24, 26 that detects specific types of information (e.g., count of people, detection of motion, etc.) could also be designated as the master device.

As a further example, a camera 20, 22 inside the secured area 12 with motion detection and a field of view that includes the door 44-1 may be designated by the operator 38 as a master device in an alarm stay or disarmed state of the alarm system 10. Other cameras 20, 22 proximate the master device may be grouped with the master device as a source of video information in order to investigate events associated with the door 44.

Correlated information may be presented to the operator 38 based upon the state of the alarm system and activation of a designated master device. For example, a sensor 16, 18 on a fire door 44-1 may be designated as a master device in the disarmed state. Upon activation of the master device, the correlation processor may search the event records 48, 50 to identify other security events that are related by time and location. The correlation in time may mean that the other security events occurred within some predetermined time period (e.g., 15 minutes) in the same general location as the location of the activated master device. Alternatively, the correlated distance may be a variable distance value calculated by a corresponding processor where the calculated distance increases with time based upon the normal walking speed of an intruder measured from the time of activation of the master device.

Figure 2:
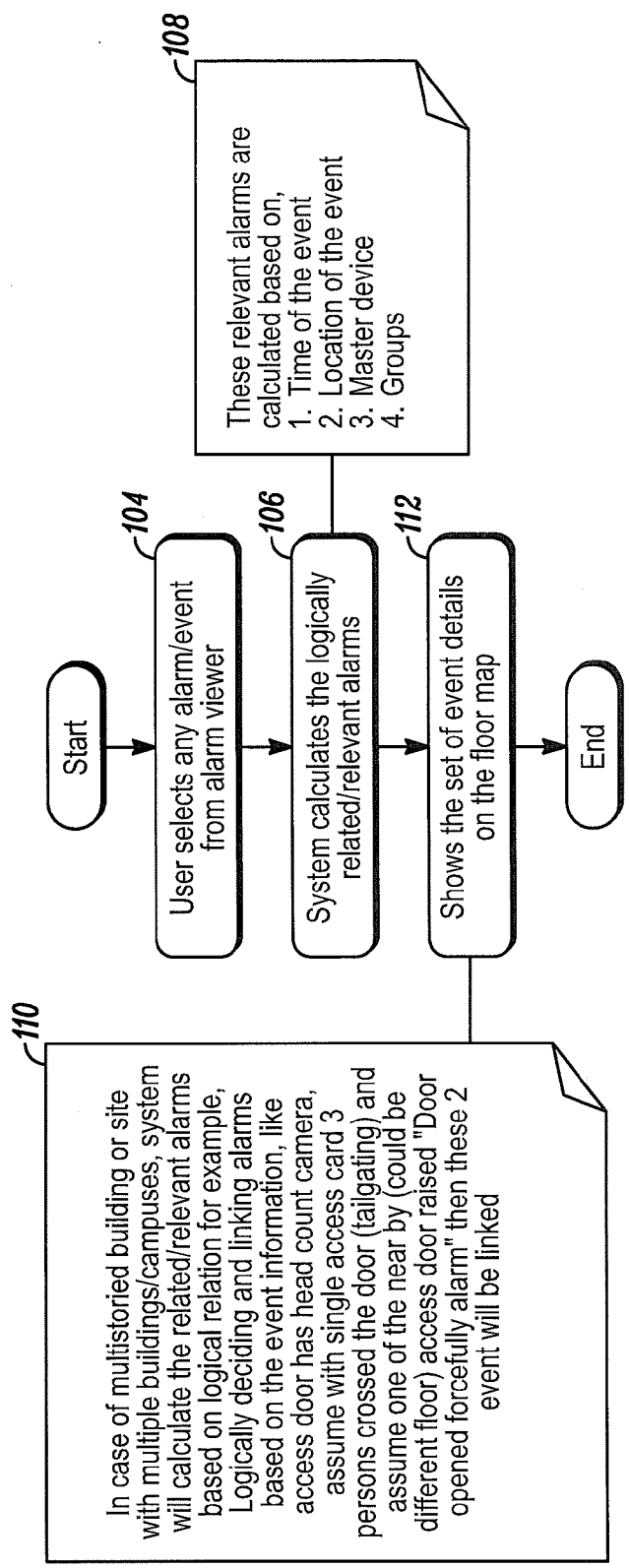
FIG. 2 is a flow chart of steps that may be followed by the system of FIG. 1.

FIG. 2 depicts a flow chart of process steps that may be followed by the correlation processor. Reference will be made to the elements of FIG. 2 as appropriate in the following discussion.

Figure 3:
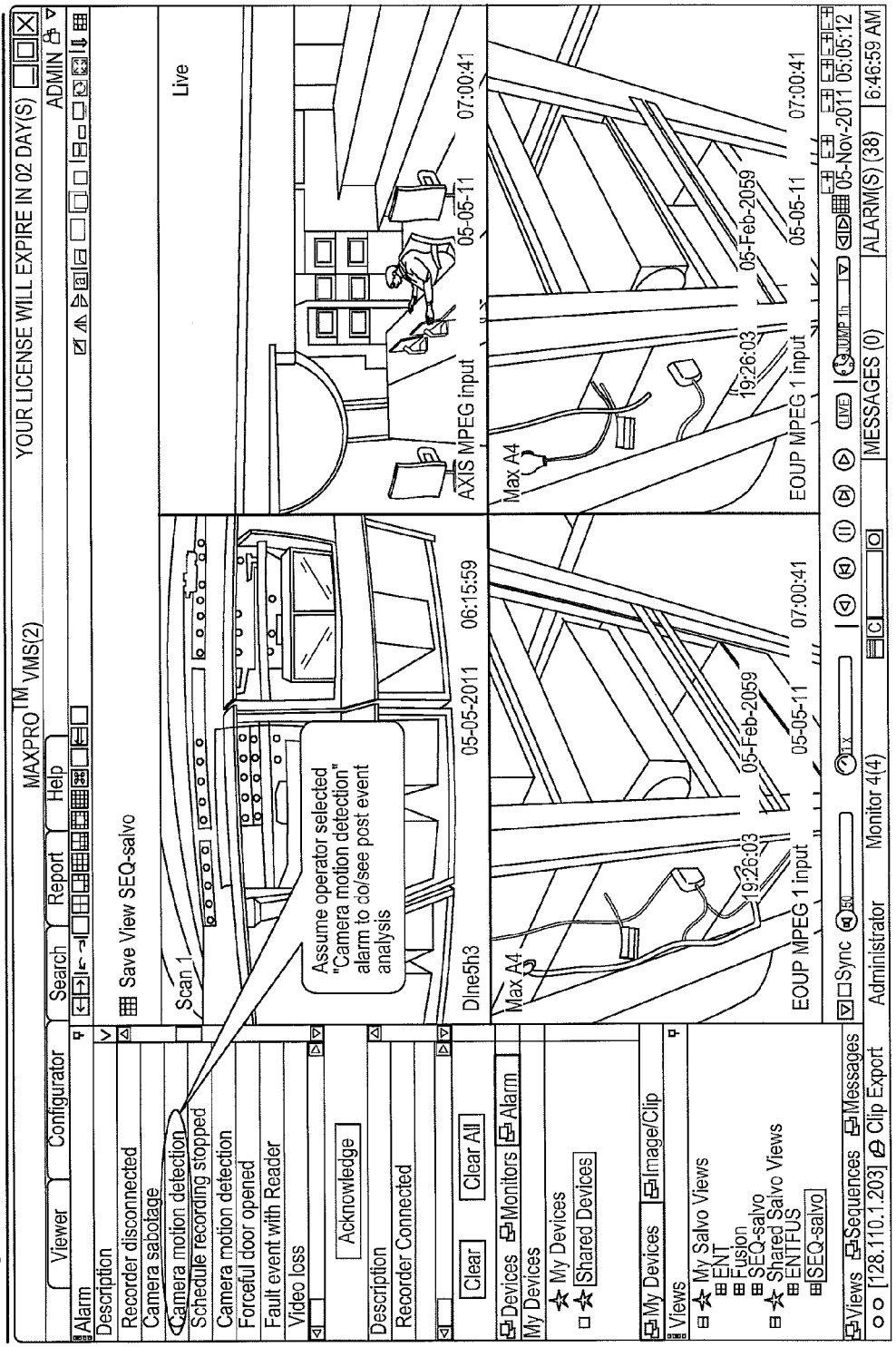
FIG. 3 depicts a screen that may be shown on the display of FIG. 1.

FIG. 3 depicts information that may be shown to the operator 38 on the display 36 during normal operation. Shown in the upper left corner is a window of currently received security events. It may be assumed for purposes of explanation that the reporting device of at least some of the currently received security events has been previously designated as a master device. As shown in FIG. 3, it may be assumed that the operator 38 has selected 104 the "Camera motion detection" alarm to activate in order to perform post event analysis via the correlation processor.

In response, a relationship processor 24, 26 calculates 106 the logically related and/or relevant alarms. The relevant alarms may be based upon the time of the event, the location of the event, the identification of the master device and the grouping of devices.

Figure 4:
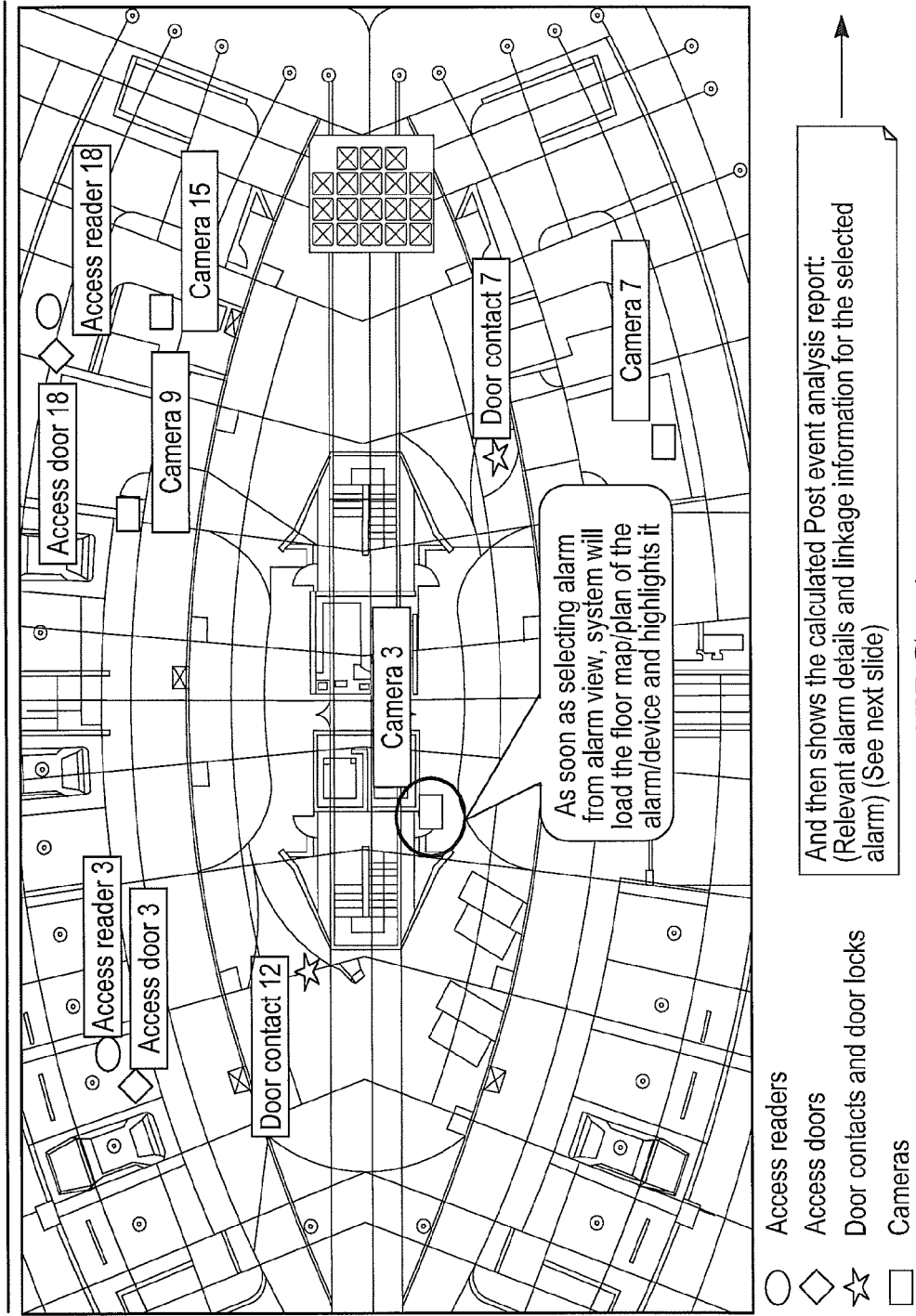
FIG. 4 depicts a map of events that may be detected within the system of FIG. 1.

A display processor 24, 26 may display 112 the security event details as depicted in FIG. 4. In this case (in FIG. 4), the selected device (camera 3) is depicted on a geographic map of the secured area 12.

Figure 5:
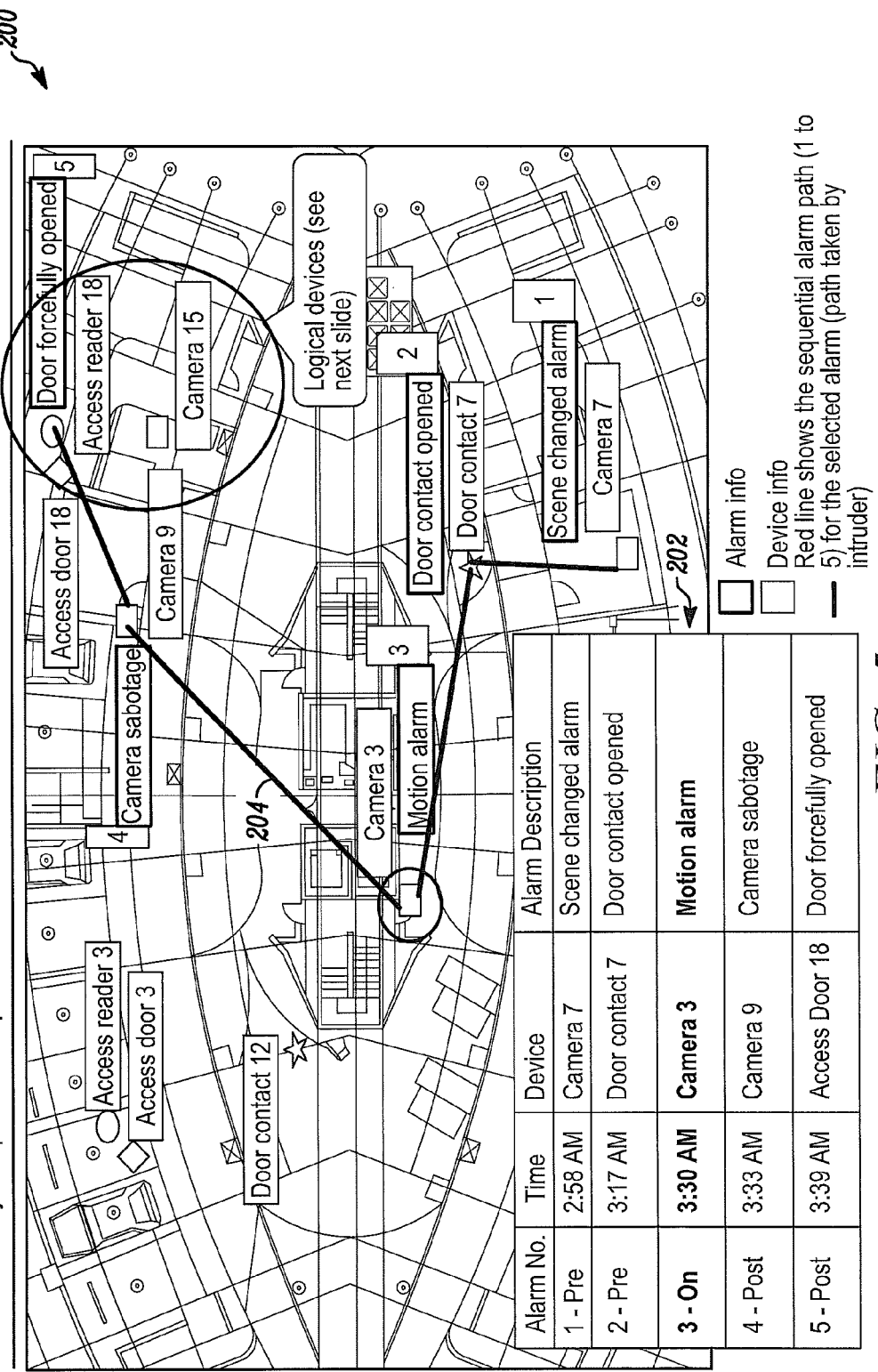
FIG. 5 depicts the map of FIG. 4 along with a potential route of an intruder traveling among the sites of the security events.

FIG. 5 shows the map of the secured area 12 along with the correlated details. Included within FIG. 5 is a window 202 of correlated events with a time of the correlated event, an identifier of the device that detected the event and an event description. Also shown in FIG. 5 is the potential route 204 of an intruder traveling among the locations of the activated sensors in accordance with a reporting time of each event.

In this case, the correlation processor identifies and orders four security events (i.e., alarm numbers 1, 2, 4 and 5) that may be associated with the selected event (i.e., alarm number 3) based upon the time of each event. The selected alarm event is shown to have occurred at 3:30 am, while associated alarm events 4 and 5 occurred at 3:33 am and 3:39 am, respectively. The correlation processor has also identified two other alarm events (i.e., pre-alarm events 1 and 2) that occurred before the selected alarm event.

The correlation processor has also determined, from the times of the respective events, that the events could be correlated in distance because the difference in times between the events is such that an intruder could have traveled (e.g., walked) from the location of one event to the next. In this case, the selected alarm event (alarm number 3) occurred at 3:30 am while pre-alarm 2 occurred at 3:17 am, thereby allowing 3 minutes for the intruder to walk from the location of door contact 7 to camera 3. As such, the correlation processor identifies that the route from door contact 7 to camera 3 is a potential route of an intruder that correlates or otherwise links alarm number 3 with pre-alarm event 2. In response, the correlation processor adds the potential route of the intruder to the map as the solid line connecting camera 3 and door contact 7. In a similar manner, the correlation processor correlates and adds a solid line (potential intruder route) between camera 3 and the camera sabotage of camera 9 because they were detected only 3 minutes apart.

The correlation processor uses a similar process to link alarm number 5 (door forced open) to alarm number 4 and adds the solid line to indicate a further potential route of the intruder between the locations of access door 18 and camera 9. In the same manner, the correlation processor correlates alarm number 1 (detected scene change) to alarm number 2 and adds the solid line to indicate a further potential route of the intruder between the locations of door contact 7 and camera 7.

As shown in FIG. 5, the correlation processor is able to quickly apprise the operator 38 of one possible way in which two or more events may be interpreted. Once apprised of the possibilities, the operator may perform a further investigation. One way that the operator 38 may do this is to individually select a panel view of the correlated events in order to view video associated with one or more of the correlated events. The selection of the panel view may be accomplished via a separate button on the user interface 42 or simply clicking on the panel 202.

Figure 6:
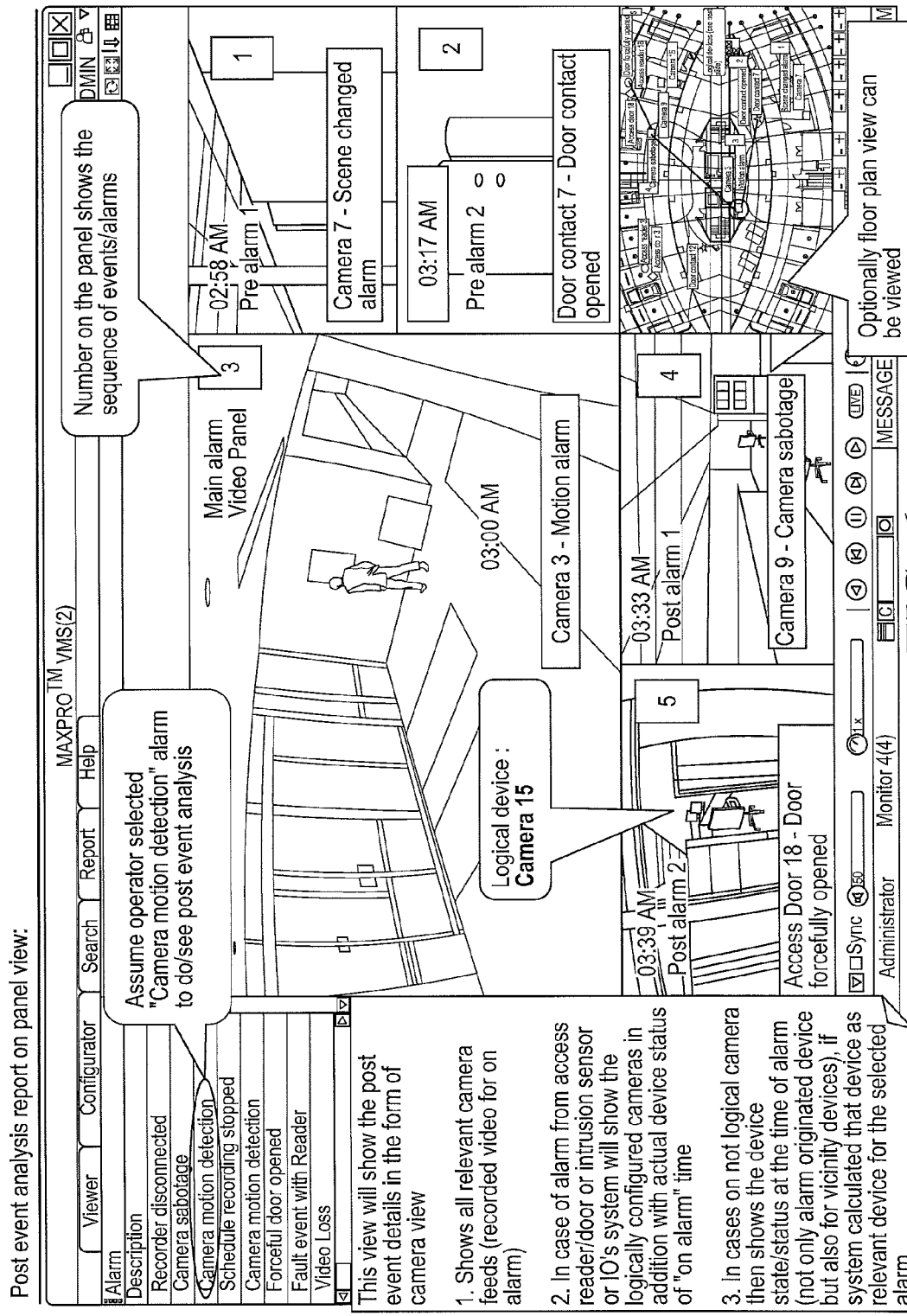
FIG. 6 depicts a panel display of the security events.

Shown in FIG. 6 is an example of a panel display of the correlated events. In this case, the correlation processor (or a separate display processor 24, 26) may select the most appropriate video source (e.g., camera) for presentation of the correlated events. In the case of alarm event 2 involving the door contact 7, the correlation processor may select a camera that has been previously grouped with or is logically linked to door contact 7.

FIG. 6 shows still frames for each of alarm events 1-5 captured at the instant of the respective event. The largest window on the display may be the originally selected event (i.e., alarm 3). Other windows adjacent the largest window may display respective images from the correlated events. Shown on the lower right corner of FIG. 6 is the map of FIG. 5. The user may toggle between the map of FIG. 5 and the panel of FIG. 6 by selecting the map on the lower right of FIG. 6 and the panel 202 of FIG. 5.

In this regard, the images shown in FIG. 6 may be retrieved from the information contained in the event files 48, 50. The identifier of the camera that captured the images and the time of the event shown in the images are retrieved from the event files 48, 50. Using this information, the presentation processor may retrieve the appropriate frames from the recorder 44.

Using the panel view of FIG. 6, the user may continue his/her investigation of the events. For example, the user may select the large window of FIG. 6 (camera 3) and activate the user interface 42 to scroll forwards and backwards in time in order to view images captured prior or subsequent to the detected event within the windows of FIG. 6. Alternatively, selection of the large window may cause the associated processor to display a sequence of images from the associated camera for a predetermined time before and after the reporting time of the event.

Alternatively, the user may select one of the windows of the correlated windows of FIG. 6 (e.g., Post alarm 1). In this case, the image from camera 9 may replace the image of camera 3 in the large window in the upper left corner of FIG. 6. As above, the user may scroll forwards and backwards in time to continue his/her investigation of the events.

As the images from the respective events are displayed on the large window of FIG. 6, the user may also access the images of cameras that are grouped with the selected camera. For example, by double clicking on the large window of FIG. 6, the display processor may display a menu of cameras that are included within the same group. In this way, the user may click on the icons of cameras from the same group to scroll through different views of the scene that originated the event.

Alternatively, cameras that are near the scene of the correlated events may be shown as a separate icon on the map of FIG. 5. In this way, the operator may click on an icon of the camera from the map of FIG. 5 to view other views of the scene of the detected event.

FIGS. 1-5 depict examples of an apparatus and method steps performed by that apparatus to analyze events. The method may include the steps of detecting a plurality of events within a secured area detected by respective sensors that have been activated within a predetermined time period of one another, wherein at least one of the plurality of events is an alarm event, ordering the plurality of events based upon a reporting time of each of the plurality of events, and displaying a map showing the respective sensors that have been activated within a predetermined time period of one another within the secured area along with a potential route of an intruder traveling among locations of the respective sensors that have been activated within a predetermined time period of one another in accordance with the reporting time of each of the plurality of events.

Similarly, the apparatus may include a plurality of devices that detect respective ones of a plurality of events within a secured area, a processor that detects respective ones of the plurality of devices that have been activated within a predetermined time period of one another, wherein at least one of the plurality of events is an alarm event, a processor that orders the plurality of events based upon a reporting time of each of the plurality of events, and a processor that displays a map showing the respective ones of the plurality of devices that have been activated within a predetermined time period of one another within the secured area along with a potential route of an intruder traveling among locations of the respective ones of the plurality of devices that have been activated within a predetermined time period of one another in accordance with the reporting time of each of the plurality of events.

Alternatively, the apparatus may include a plurality of event records embodied as files saved in a non-transitory computer readable medium, wherein each of the plurality of event records includes an indication of a plurality of devices that detected respective ones of a plurality of events within a secured area and an indication of respective sensors that have been activated within a predetermined time period of one another, and wherein at least one of the plurality of events is an alarm event, a processor that orders the plurality of events based upon a reporting time of each of the plurality of events, and a processor that displays a map showing the respective sensors that have been activated within a predetermined time period of one another within the secured area along with a potential route of an intruder traveling among locations of the respective sensors that have been activated within a predetermined time period of one another in accordance with the reporting time of each of the plurality of events.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
monitoring a plurality of sensors including at least one door switch that detect threats within a secured area;
detecting a plurality of at least three events within the secured area detected by respective sensors of the plurality of sensors that have been activated within a predetermined time period of one another, wherein at least one of the plurality of at least three events is an alarm event;
ordering the plurality of at least three events based upon a reporting time of each of the plurality of at least three events;
correlating the ordered plurality of at least three events based upon time, location, and distance between the ordered plurality of at least three events, wherein the distance is a variable distance value calculated by a corresponding processor, wherein the variable distance value between the ordered plurality of at least three events increases with the time based upon a normal walking speed of an intruder measured from a time of activation of a first of any two of the ordered plurality of at least three events, and wherein the variable distance value is correlated to an actual distance between the ordered plurality of at least three events because the intruder could have traveled from the location of one of the ordered plurality of at least three events to a next of the ordered plurality of at least three events;
displaying the correlated, ordered plurality of at least three events automatically in response to detecting the alarm event; and
displaying a map showing the respective sensors of the plurality of sensors that have been activated within the predetermined time period of one another within the secured area along with a potential route of the intruder traveling among the location of the respective sensors of the plurality of sensors that have been activated within the predetermined time of one another in accordance with the distance and the reporting time of each of the plurality of at least three events.

2. The method as in claim 1 wherein the predetermined time period further comprises a walking time of the intruder between the location of the respective sensors of the plurality of sensors that have been activated within the predetermined time period of one another.

3. The method as in claim 1 wherein the plurality of sensors further comprises at least one camera.

4. The method as in claim 3 wherein the alarm event further comprises the at least one camera detecting motion in a field of view of the at least one camera.

5. The method as in claim 4 further comprising an operator selecting an icon of the at least one camera on the map and viewing a sequence of images from the at least one camera captured at the reporting time of one of the plurality of at least three events from the at least one camera.

6. The method as in claim 1 further comprising depicting an icon of a nearby camera on the map, wherein a field of view of the nearby camera encompasses one of the respective sensors of the plurality of sensors that have been activated within the predetermined time period of one another.

7. The method as in claim 6 further comprising an operator selecting the icon of the nearby camera and viewing a sequence of images from the nearby camera at the reporting time of one of the plurality of at least three events detected by the one of the respective sensors of the plurality of sensors that have been activated within the predetermined time period of one another.

8. The method as in claim 6 further comprising an operator selecting the icon of the nearby camera and viewing a sequence of images from the nearby camera for a predetermined time before or after the reporting time of one of the plurality of at least three events detected by the one of the respective sensors of the pluratlity of sensors that have been activated within the predetermined time period of one another.

9. The method as in claim 1 wherein the plurality of at least three events further comprises granting access by an authorized person to the secured area and detecting simultaneous entry into the secured area through a same entry portal by another person in addition to the authorized person.

10. The method as in claim 1 further comprising depicting a list of selectable icons on the map, wherein each of the selectable icons corresponds to one of the respective sensors of the plurality of sensors that have been activated within the predetermined time period of one another.

11. The method as in claim 1 further comprising at least some of the plurality of at least three events occurring before the alarm event.

12. An apparatus comprising:
a plurality of devices including at least one door switch that detects a plurality of at least three respective events within a secured area;
a processor that detects respective ones of the plurality of devices activated within a predetermined time period of one another, wherein at least one of the plurality of at least three respective events is an alarm event;
a processor that orders the plurality of at least three respective events based upon a reporting time of each of the plurality of at least three respective events;
a processor that correlates the ordered plurality of at least three respective events based upon time, location, and distance between the ordered plurality of at least three respective events, wherein the distance is a variable distance value calculated by a corresponding processor, wherein the variable distance value between the ordered plurality of at least three respective events increases with the time based upon a normal walking speed of an intruder measured from a time of activation of a first of any two of the ordered plurality of at least three respective events, and wherein the variable distance value is correlated to an actual distance between the ordered plurality of at least three respective events because the intruder could have traveled from the location of one of the ordered plurality of at least three respective events to a next of the ordered plurality of at least three respective events;

a processor that displays the correlated, ordered plurality of at least three respective events automatically in response to detecting the alarm event; and a processor that displays a map showing the respective ones of the plurality of devices activated within the predetermined time period of one another within the secured area along with a potential route of the intruder traveling among the location of the respective ones of the plurality of devices activated within the predetermined time period of one another in accordance with the distance and the reporting time of each of the plurality of at least three respective events.

13. The apparatus as in claim 12 further comprising a processor calculating the predetermined time period based upon the distance between the location of the respective ones of the plurality of devices activated within the predetermined time period of one another and an average walking speed of the intruder.

14. The apparatus as in claim 12 wherein the plurality of devices further comprises at least one camera.

15. The apparatus as in claim 14 further comprising a processor associated with the at least one camera that detects motion in a field of view of the at least one camera.

16. The apparatus as in claim 15 further comprising a panel view of detected ones of the plurality of at least three respective events selectable from the map.

17. The apparatus as in claim 16 further comprising an icon of another camera displayed on the panel view, wherein a field of view of the another camera encompasses one of the respective ones of the plurality of devices activated within the predetermined time period of one another.

18. The apparatus as in claim 17 further comprising an operator selecting the icon of the another camera and a processor that displays a sequence of images from the another camera for viewing at the reporting time of one of the plurality of at least three respective events detected by the one of the respective ones of the plurality of devices activated within the predetermined time period of one another.

19. The apparatus as in claim 12 further comprising a processor that detects granting of access to an authorized person into the secured area and that detects simultaneous entry into the secured area through a same entry portal by another person in addition to the authorized person.

20. An apparatus comprising:

a plurality of sensors including at least one door switch that detects threats within a secured area;

a plurality of at least three event records embodied as files saved in a non-transitory computer readable medium, each of the plurality of event records containing a record of activation of one of the plurality of sensors that detected respective ones of a plurality of events within the secured area, wherein respective ones of the plurality of sensors of the plurality of at least three event records have been activated within a predetermined time period of one another, and wherein at least one of the plurality of events is an alarm event;

a processor that orders the plurality of events based upon a reporting time of each of the plurality of events;

a processor that correlates the ordered plurality of events based upon time, location, and distance between the ordered plurality of events, wherein the distance is a variable distance value calculated by a corresponding processor, wherein the variable distance value between the ordered plurality of events increases with the time based upon a normal walking speed of an intruder measured from a time of activation of a first of any two of the ordered plurality of events, and wherein the variable distance value is correlated to an actual distance between the ordered plurality of events because the intruder could have traveled from the location of one of the ordered plurality of events to a next of the ordered plurality of events;

a processor that displays the correlated, ordered plurality of events automatically in response to detecting the alarm event; and a processor that displays a map showing the respective ones of the plurality of sensors of the plurality of at least three event records that have been activated within the predetermined time period of one another within the secured area along with a potential route of the intruder traveling among the location of the respective ones of the plurality of sensors of the plurality of at least three event records that have been activated within the predetermined time period of one another in accordance with the distance and the reporting time of each of the plurality of events.

* * * * *